Figure 1:
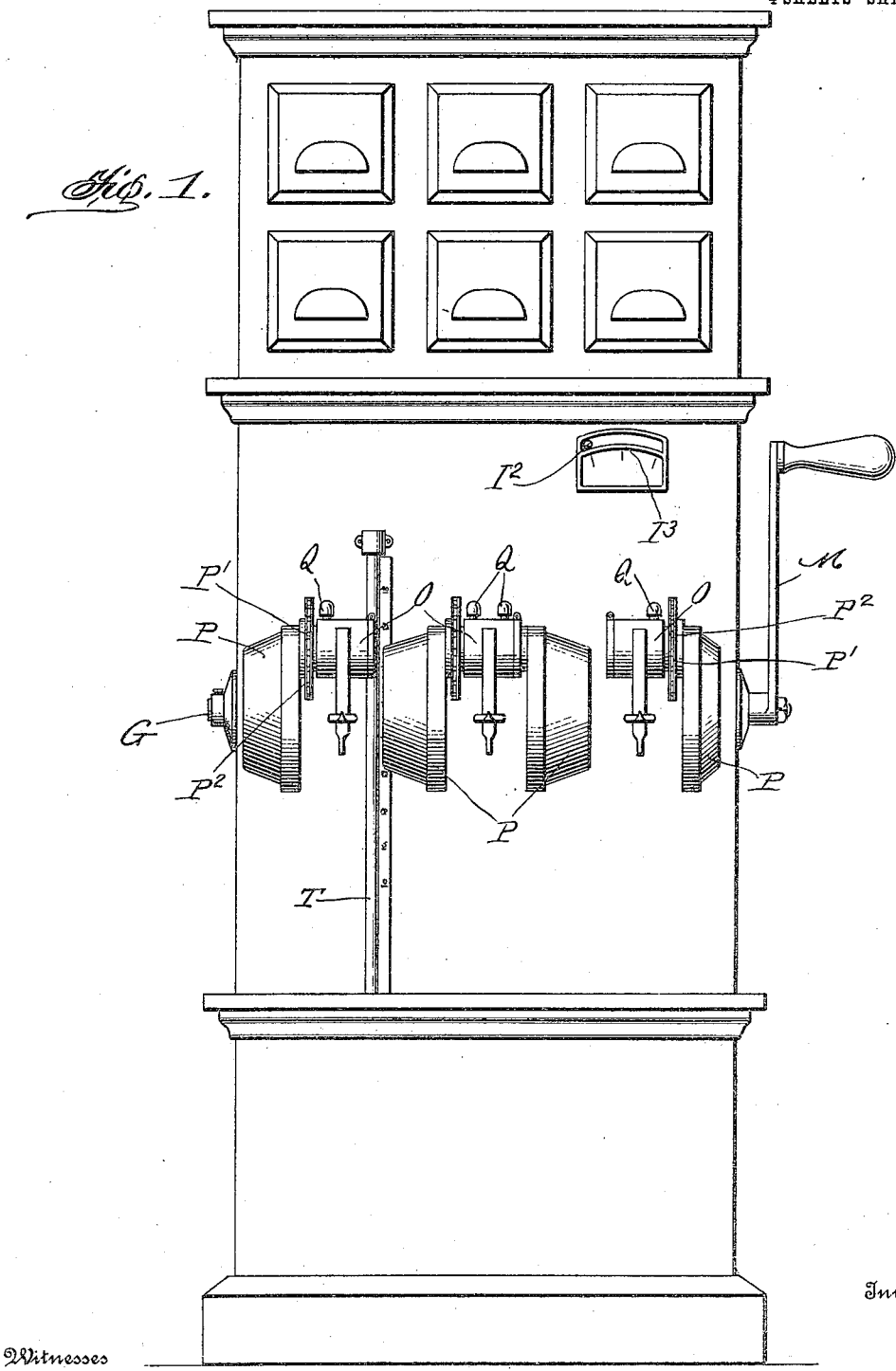

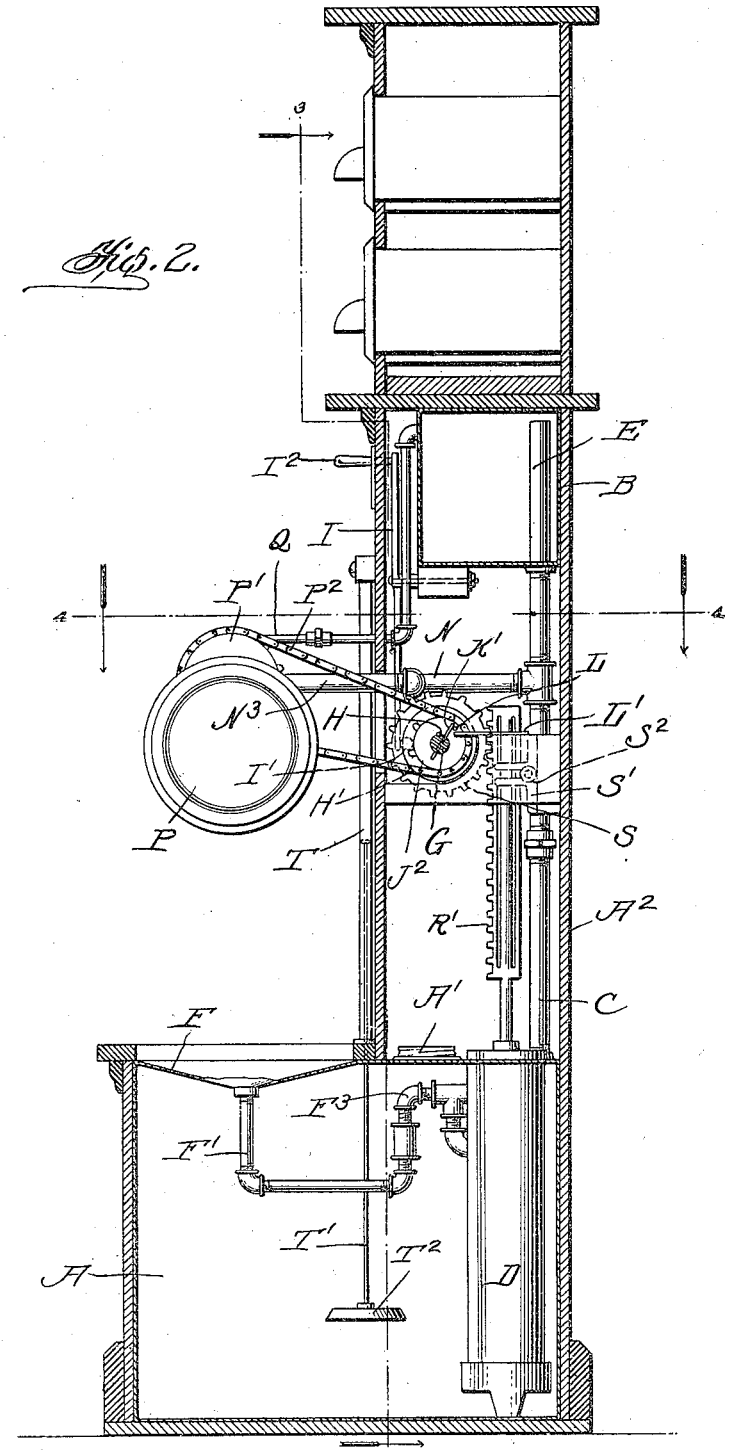

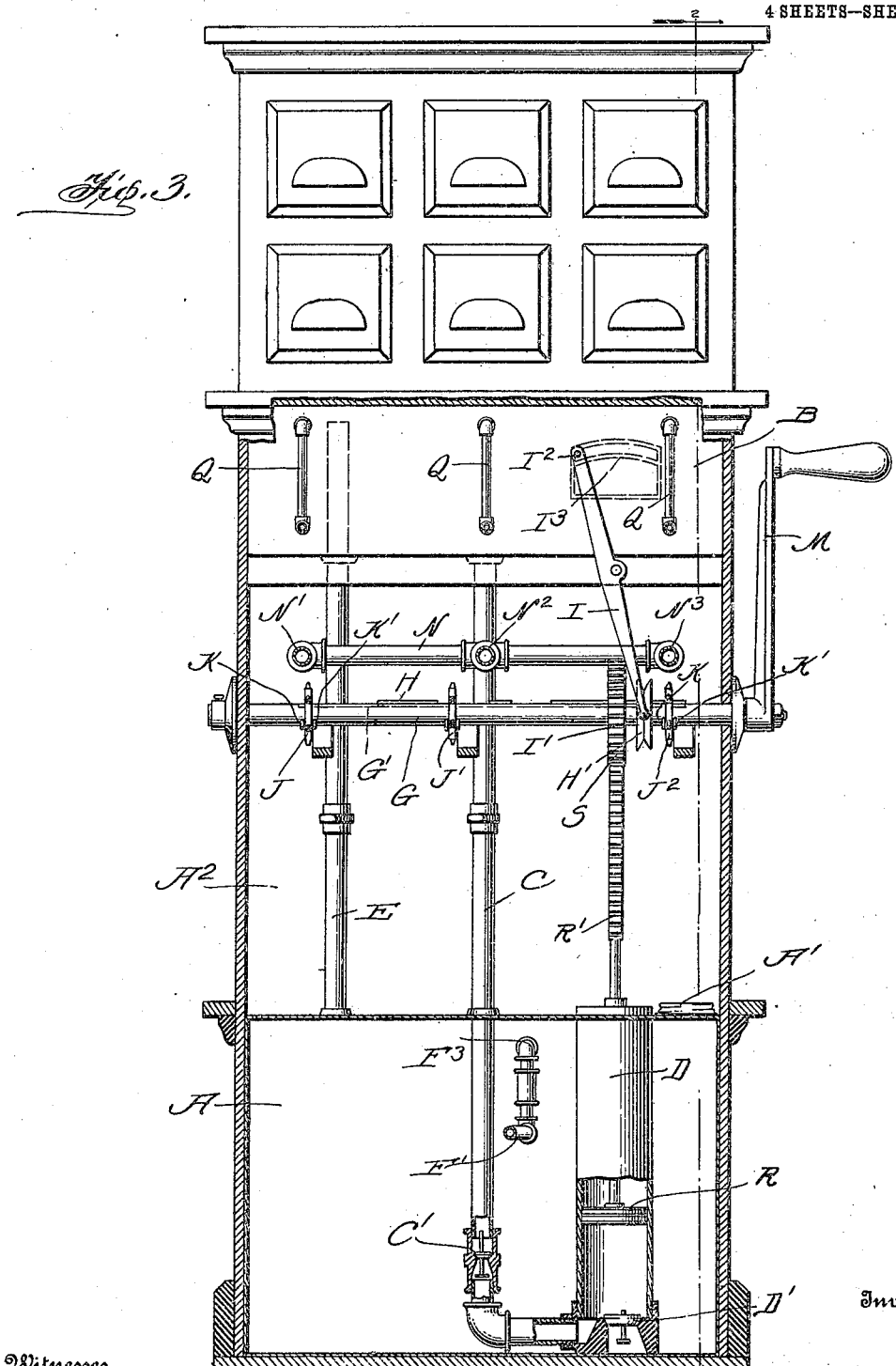

J. C. BRANTLEY.
LIQUID DISPENSING APPARATUS.
APPLICATION FILED AUG. 3, 1908.
953,408. Patented Mar. 29, 1910.
4 SHEETS—SHEET 4.
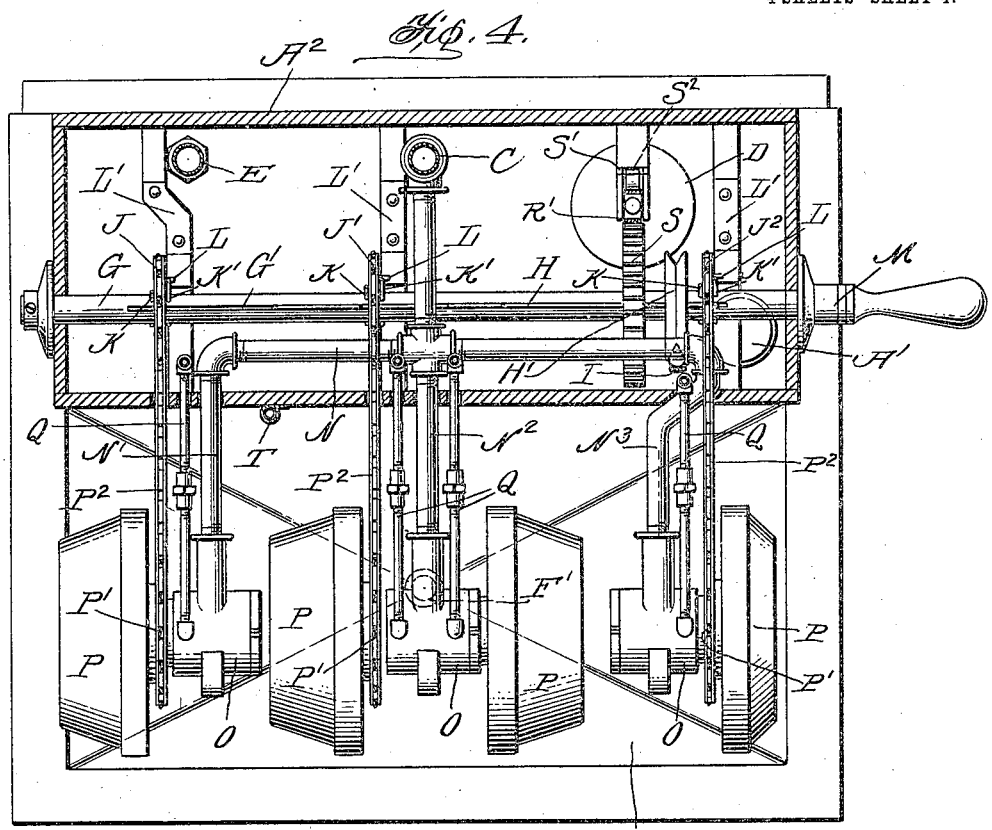
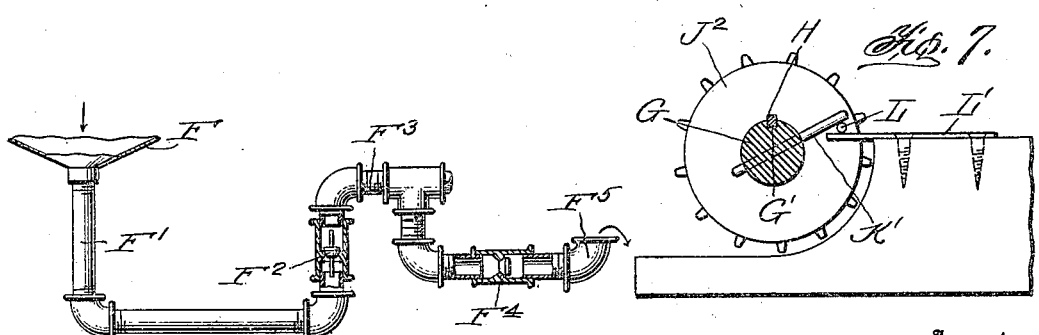
Witnesses
Inventor
J. C. Brantley,

UNITED STATES PATENT OFFICE.

JOHN CHARLES BRANTLEY, OF LAKE CORMORANT, MISSISSIPPI.

LIQUID-DISPENSING APPARATUS.

953,408.  Specification of Letters Patent.  Patented Mar. 29, 1910.

Application filed August 3, 1908. Serial No. 446,813.

*To all whom it may concern:*

Be it known that I, JOHN CHARLES BRANTLEY, a citizen of the United States, residing at Lake Cormorant, in the county of De Soto and State of Mississippi, have invented a new and useful Improvement in a Liquid-Dispensing Apparatus, of which the following is a specification.

This invention relates to a liquid dispensing apparatus and more particularly to an apparatus for dispensing coal oil, the object being to provide a device by means of which a quart, half gallon or a gallon of coal oil can be quickly measured by simply operating a crank arm.

A further object of the invention is to provide an apparatus which is exceedingly simple in construction and one which is composed of a few parts which are so arranged that they are not likely to get out of order in operation.

A still further object of my invention is to provide a dispensing apparatus which has a plurality of measures which are so connected to a delivery tank that they can be quickly operated so as to dispense the liquid from any one of the measures or all of the same, the dispensing tank being supplied with oil through a reservoir by a pump which is operated when the measures are operated.

A further object of the invention is to provide novel means for locking the sprocket wheels on the main shaft so that any one of the same can be locked or released by simply operating a lever.

A still further object of the invention is to provide a dispensing apparatus which is provided with a drip pan for returning the waste oil to the reservoir so that the oil will be carried back into the reservoir by the action of the pump which will prevent all danger of fire and at the same time the oil within the tank will be impregnated with air so as to give it more life.

Another object of the invention is to provide a dispensing apparatus with a gage so that the amount of oil within the reservoir can be quickly ascertained at all times.

With these various objects in view, my invention consists in the novel features of construction hereinafter described, pointed out in the claims and shown in the accompanying drawings, in which—

Figure 1 is a front view of my improved liquid dispensing apparatus. Fig. 2 is a vertical section through my improved apparatus taken on line 2—2 of Fig. 3. Fig. 3 is a vertical section through my improved apparatus taken on line 3—3 of Fig. 2. Fig. 4 is a horizontal section through my improved apparatus taken on line 4—4 of Fig. 2. Fig. 5 is a detail view of a locking key. Fig. 6 is a detail view of the drain pipe, and Fig. 7 is a detail enlarged view showing the stop for locking the shaft.

In carrying out my improved invention, I employ a cabinet in which is arranged a reservoir A preferably formed of galvanized iron or sheet metal and provided with a cap A′ which is screwed thereon through which the tank is filled. Arranged within the upper portion $A^2$ of the cabinet is a delivery tank B formed of any suitable metal which is connected to the reservoir A by a supply pipe C which extends downwardly into the reservoir and is provided with a check valve C′ which is connected to a pump cylinder D which is provided with a valve D′ of the ordinary construction as will be hereinafter fully described. The delivery tank B is provided with an over-flow pipe E which extends into the reservoir A so that the oil will be carried back into the reservoir when the required amount has been pumped therein so that all danger of the tank becoming too full so as to prevent the vent pipes hereinafter fully described from venting the measures is prevented. It will be seen by this arrangement that the liquid from the reservoir A will be forced up into the tank B at every stroke of the piston so that the tank will always be kept full.

A drip pan F is formed in the top of the reservoir A as clearly shown in Fig. 2 and is provided with a tapering bottom to which is connected a drain pipe F′ which communicates with a check valve $F^2$ to which is connected a pipe $F^3$ provided with a check valve $F^4$ carrying an over-flow pipe $F^5$ which extends upwardly adjacent the top of the tank so that all oil wasted in filling vessels will be carried back into the tank as will be hereinafter described.

Mounted in suitable brackets under the delivery tank B is a shaft G provided with a longitudinal groove G′ in which is slidably mounted a key H which is provided with cut out portions as clearly shown. Connected to the key is a grooved pulley H′ in which works an anti-friction roller I′ carried by the end of a pivoted lever I which is provided with a handle I² which works over a plate I³ which is marked so as to indicate the different measures which will be operated as will be hereinafter fully described.

Loosely mounted on a shaft G are sprockets J, J' and J² which are provided with grooved hubs to receive the key H but are normally held over the reduced portion of the keys so that the shaft can be rotated without rotating the sprockets. These sprockets are held in position on the shaft by pins K, K', the pins K' being longer than the pins K and being adapted to engage the transverse pins L carried by the respective sprockets so as to normally hold the grooved hubs of the sprockets in alinement with the groove of the shaft so that when the lever is operated, the key will be guided into the groove which will lock the sprockets on the shaft so that they will be operated when the shaft is rotated. The pins L are adapted to engage strips L' forming stops for limiting the movement of the sprockets. Secured on the end of the shaft G is a crank arm M for operating the shaft and it will be seen that when the crank arm is turned any one of the sprockets or all of the same can be rotated by simply adjusting the lever.

Extending outwardly from the supply pipe C under the delivery tank B is a delivery pipe N which is provided with branch pipes N', N² and N³, which are connected to casings O in which are mounted the central sections of measuring vessels P which are fully illustrated in Patent Number 748,694, granted to H. J. Brantley and myself, January 5, 1904. These measures are preferably formed in one quart, one-half gallon and one gallon sizes to enable any amount of liquid to be dispensed. Secured on the respective vessels are sprocket wheels P' carrying sprocket chains P² which pass over the sprockets carried by the shaft G so that when the sprockets are rotated the vessels will be rotated whereby any desired amount of liquid can be dispensed. The casings of the measures are connected to the delivery tank B by vent tubes Q which thoroughly vents the vessels so that the liquid will readily pass into and out of the same and it will be seen that by adjusting the lever so as to lock any one of the sprockets on the shaft G the corresponding sprocket of the measuring vessels will be rotated which will rotate the vessel and allow the liquid to pass out of the discharge spout of the casing.

Mounted within the pump cylinder D is a piston R which extends up above the reservoir and is provided with a rack portion R' which is engaged by a gear S fixed on the shaft G so that every time the crank arm M is operated, the pump will be operated so as to force liquid out of the reservoir up into the delivery tank and it will be seen that if the supply of oil is greater than the discharge, the oil will over-flow and be carried back into the reservoir. The waste oil which over-flows from the vessel being filled will be carried back into the reservoir through the pipes and valves as when the oil is forced out of the reservoir by the pump a partial vacuum is created within the reservoir which will draw the oil out of the pipes through the check valves and at the same time will draw in a certain amount of air so that the oil will become impregnated with the air, which gives it more life.

Secured on the back of the upwardly projecting portion of the reservoir is a bracket S' provided with bifurcated arms which extend out to each side of the rack portion and which bracket has pivotally mounted within the bifurcations the pintles of an anti-friction roller S² so that the rack portion will be guided vertically whereby all danger of the rack portion being thrown out of engagement with the gear is prevented.

Extending upwardly from the reservoir is a glass gage T which is graduated and in which works the rod T' of a float T², arranged within the reservoir so that the amount of oil within the reservoir can be quickly ascertained at all times.

It will be seen that by providing the drip pan with pipes having check valves working in opposite directions the pressure of the tank will be held so that the oil will be thoroughly mixed with air.

The operation is as follows:—Assuming that the delivery tank has been filled with oil and that the measuring vessels are also filled by adjusting the lever so as to lock any one of the sprockets on the main shaft, the corresponding measuring vessel will be rotated which will allow the oil to pass readily out of the same into a suitable vessel on the tank over the drip pan and it will be seen that at the same time, the piston of the pump will be operated so as to force more oil up into the delivery tank and the vessel will be refilled ready to be discharged.

The description of the measuring vessels has not been given in detail as they are fully described in the above named patent.

What I claim is:—

1. In an apparatus of the kind described, the combination with a delivery tank, of a reservoir connected to said tank, a pump for supplying oil from the reservoir to the delivery tank, measures connected to said delivery tank and means for operating said measures and pump simultaneously.

2. In an apparatus of the kind described, the combination with a cabinet carrying a reservoir, of a delivery tank connected to said cabinet, a pump for supplying oil to the delivery tank, a plurality of casings carrying revoluble measures connected to said delivery tank and means for operating said measures and pump simultaneously.

3. In an apparatus of the kind described, the combination with a reservoir, of a delivery tank, a pump for supplying oil from the reservoir to the tank, a plurality of revoluble measures connected to the delivery tank, and a shaft carrying means for operating said measures and pump.

4. In an apparatus of the kind described, the combination with a reservoir, of a delivery tank, a pump for supplying liquid from the reservoir to the delivery tank, a plurality of casings connected to the delivery tank, revoluble measures carried by the casings, sprockets carried by the measures, a shaft provided with a plurality of sprockets carrying chains passing over the sprockets of the measures and means carried by the shaft for locking the sprockets of the shaft thereon, for the purpose described.

5. In an apparatus of the kind described, the combination with a cabinet, of a reservoir arranged within the cabinet, a delivery tank arranged above said reservoir, a pump arranged within the reservoir for supplying liquid to the delivery tank the piston rod of the pump being provided with a rack portion, a shaft provided with a gear for engaging said rack portion, a plurality of loosely mounted sprockets arranged on said shaft, a plurality of revoluble measures carrying sprockets, chains passing over the sprockets of the measures and shaft, and means for locking said sprockets to the shaft whereby any one or all of said sprockets can be rotated.

6. In an apparatus of the kind described, the combination with a plurality of revoluble measures, a shaft carrying a plurality of sprockets, sprockets carried by the measures carrying chains passing over the sprockets of the shaft and means for operating said shaft together with means for locking said sprockets to the shaft.

7. In an apparatus of the kind described, the combination with a plurality of revoluble measures carrying sprockets, of a shaft carrying a plurality of loosely mounted sprockets, chains passing over the respective sprockets, means for operating said shaft, a key carried by the shaft for locking said sprocket and means for operating said key whereby any one of said sprockets or all of said sprockets can be locked to the shaft.

8. In an apparatus of the kind described, the combination with a plurality of casings, a delivery tank connected to said casings, revoluble measures mounted within the casings means for supplying liquid to the delivery tank from a main reservoir means for operating said means and means for revolving said measures.

9. In an apparatus of the kind described, the combination with a cabinet, of a reservoir mounted within the cabinet, a pump arranged within the reservoir provided with a piston rod having a rack portion, pipes connecting said pump to a delivery tank, a plurality of revoluble measures connected to said delivery tank, a shaft provided with means for rotating said measures, a gear carried by the shaft engaging the rack of the piston rod, means for limiting movement of said shaft together with means for operating the same whereby said measures will be revolved and the piston rod reciprocated.

10. In an apparatus of the kind described, the combination with a plurality of revoluble measures carrying sprockets, of a shaft provided with a longitudinal groove, a plurality of sprockets loosely mounted on said shaft provided with grooves adapted to register with the groove of the shaft, chains connecting the respective sprockets, means for holding the grooves in alinement with each other, a key arranged within the groove of the shaft for locking said sprockets thereto and means for operating said key.

11. In an apparatus of the kind described, the combination with a plurality of revoluble measures carrying sprockets, of a shaft provided with a longitudinal groove, a plurality of sprockets loosely mounted on said shaft provided with grooves, chains connecting the sprockets of the shaft to the sprockets of the measures, means for normally holding the shaft so that the groove of the same will aline with the grooves of the sprockets, a key mounted in the groove of the shaft, a grooved pulley mounted on the shaft connected to said key and a lever working in said pulley whereby any one of said sprockets can be locked to the shaft.

12. In an apparatus of the kind described, the combination with a cabinet having a delivery tank and a reservoir, a pump for supplying oil from the reservoir to the delivery tank, a rack portion formed on the piston rod of the pump, a shaft provided with a gear meshing with said rack portion, a plurality of sleeves connected to said tank by vent tubes, a plurality of measures revolubly mounted in said sleeves, a pipe connecting said sleeves to the delivery tank, a shaft provided with a gear meshing with the rack of the piston, sprockets carried by the measures, sprockets carried by the shaft carrying sprocket chains passing over the sprockets of the measures and means for operating said shaft together with means for locking said sprockets thereon.

JOHN CHARLES BRANTLEY.

Witnesses:
F. M. NORFLEET,
L. E. HEATH.